(12) United States Patent
Mueller

(10) Patent No.: US 6,726,973 B2
(45) Date of Patent: Apr. 27, 2004

(54) TWO SIDED GRAPHICAL IMAGE DVDS AND METHODS FOR MAKING SAME

(75) Inventor: William R. Mueller, Clarks Summit, PA (US)

(73) Assignee: WEA Manufacturing Inc., Olyphant, PA (US)

( * ) Notice: Subject to any disclaimer, the term of this patent is extended or adjusted under 35 U.S.C. 154(b) by 128 days.

(21) Appl. No.: 10/163,777

(22) Filed: Jun. 4, 2002

(65) Prior Publication Data

US 2002/0157770 A1 Oct. 31, 2002

Related U.S. Application Data

(62) Division of application No. 09/017,266, filed on Feb. 2, 1998, now Pat. No. 6,440,248.

(51) Int. Cl.$^7$ .............................................. B32B 3/00
(52) U.S. Cl. ...................... 428/64.4; 428/65.2; 428/66.5
(58) Field of Search .............................. 428/65.2, 66.5, 428/64.4, 66.6, 64.8, 64.2; 430/295, 270.11, 321; 264/1.33; 369/273, 283, 275.4, 286; 156/277, 182, 219, 209

(56) References Cited

U.S. PATENT DOCUMENTS

| 3,689,078 A | 9/1972 | Ban | 274/42 P |

(List continued on next page.)

| 5,946,286 A | 8/1999 | Bahns | 369/275.3 |

FOREIGN PATENT DOCUMENTS

| EP | 0 063 439 A1 | 10/1982 | | G11B/7/24 |
| EP | 0 437 223 A2 | 7/1991 | | G11B/7/24 |
| EP | 0 514 156 A2 | 11/1992 | | G11B/23/40 |
| EP | 0 671 730 A1 | 9/1995 | | G11B/7/00 |
| EP | 933760 A2 | * 8/1999 | | G11B/7/26 |
| GB | 2203278 A | 10/1988 | | G11B/7/24 |
| JP | 5054599 | 3/1993 | | G11B/23/38 |
| JP | 8180463 | 7/1996 | | G11B/7/24 |
| JP | 08180463 A | * 7/1996 | | G11B/7/24 |
| JP | 8194972 | 7/1996 | | G11B/7/24 |
| JP | 08273331 A | * 10/1996 | | G11B/23/40 |
| JP | 8273331 | 10/1996 | | G11B/23/40 |
| JP | 9081964 | 3/1997 | | G11B/7/24 |
| WO | WO 94/10684 | 5/1994 | | G11B/7/00 |
| WO | WO 95/04352 | 2/1995 | | G11B/7/00 |
| WO | WO 98/41982 | 9/1998 | | G11B/7/24 |

OTHER PUBLICATIONS

Machine Translation of JP 08–180463 A.*
Machine Translation of JP 08–273331 A.*
English Translation of JP 09–081964 A.*
F. Vizard, "Video's New Look," Popular Mechanics, May 1995, p. 32.

*Primary Examiner*—Jeff H. Aftergut
*Assistant Examiner*—Gladys Corcoran
(74) *Attorney, Agent, or Firm*—Fish & Neave; Robert R. Jackson

(57) ABSTRACT

Methods for forming a single-side-readable DVD having graphical information viewable from the DVD's frontside disc are provided. A first, frontside disc having a first and a second surface, with the second surface comprising program information and coated with a semi-reflective coating, is bonded to a second, backside disc having a third and a fourth surface. A first portion of the fourth surface comprises spillover program information and a second portion of the fourth surface comprises graphical information. The fourth surface is coated with a reflective coating. During DVD formation, the frontside and backside discs are adhesively bonded back to back so that the second surface of the frontside disc faces the fourth surface of the backside disc. Because the frontside disc comprises a semi-reflective coating, the graphical information on the second portion of the fourth surface of the backside disc is viewable through the frontside disc. The graphical information does not affect the playability of the DVD.

12 Claims, 2 Drawing Sheets

U.S. PATENT DOCUMENTS

| | | | |
|---|---|---|---|
| 4,629,668 A | 12/1986 | Hamersley et al. | 430/11 |
| 4,967,286 A | 10/1990 | Nomula et al. | 358/342 |
| 5,068,846 A | 11/1991 | Kramer | 369/275.1 |
| 5,138,604 A | 8/1992 | Umeda et al. | 369/103 |
| 5,346,654 A | 9/1994 | Kodaka et al. | 264/1.33 |
| 5,398,231 A | 3/1995 | Shin et al. | 369/275.4 |
| 5,452,282 A | 9/1995 | Abraham | 369/603 |
| 5,540,966 A | 7/1996 | Hintz | 428/64.1 |
| 5,675,570 A * | 10/1997 | Ohira et al. | 369/275.1 |
| 5,820,961 A | 10/1998 | Maruyama et al. | 428/64.1 |

* cited by examiner

TWO SIDED GRAPHICAL IMAGE DVDS AND METHODS FOR MAKING SAME

CROSS-REFERENCE TO RELATED APPLICATIONS

This is a division of application Ser. No. 09/017,266, filed Feb. 2, 1998 now U.S. Pat. No. 6,440,248, which is hereby incorporated by reference herein in its entirety.

BACKGROUND OF THE INVENTION

This invention relates to information recording media in the form of light-readable discs, and more particularly to such media which are made up of two such discs secured to one another back to back to form a two-sided stack.

Light-readable information recording media in the form of discs are well known as shown, for example, by Kramer U.S. Pat. No. 5,068,846. Commercially available compact discs ("CDs") and compact disc read-only memories ("CD-ROMs") are examples of recording media of this general type.

More recently, digital versatile discs ("DVDs") have emerged wherein light-readable information technology is employed to record movies and other similar real-time audio/visual programming (hereinafter "program information") on discs. To increase program information storage capacity, DVDs are formed from two discs (similar in appearance to conventional audio CDs) bonded back to back (see, for example, Marquardt U.S. Pat. 5,729,533, the entire contents of which are hereby incorporated by reference). Because relatively long audio/visual programs will not fit on one disc of conventional audio CD size, the "backside" disc (i.e., the second disc bonded to the back of the "frontside" or first disc) of a DVD may often contain "spillover" audio/visual program information (i.e., information which would not fit on the frontside of the DVD).

DVDs come in two forms: (1) DVDs wherein frontside program information is read by shining a laser beam on the frontside disc and wherein spillover program information is read by shining a laser beam on the backside disc (i.e., two-side-readable DVDs); and (2) DVDs wherein both frontside program information and spillover program information are read by shining a laser beam on the frontside disc (i.e., single-side-readable DVDs). The placement of graphical image data on and the formation of two-side-readable DVDs are described in previously incorporated Marquardt U.S. Pat. No. 5,729,533.

A two-side-readable DVD according to the Marquardt patent is shown in FIG. 1a. It comprises first and second discs 120 and 140 bonded to one another back to back to form a stack. Disc 120 typically includes a transparent plastic substrate 122, the upper surface of which is patterned as shown at 124 to record programming information. The patterned surface 124 is covered with a layer 126 of highly reflective material, such as aluminum. To protect the reflective layer 126, a resin layer 128 is deposited on the side of layer 126 which faces away from the pattern 124. Disc 140 is bonded to the exposed surface of layer 128, for example, by means of a hot melt glue layer 130.

Modifying a surface of disc 140 to provide visible indicia on that disc is also shown in FIG. 1a. In this embodiment technology similar to that used to record programming on disc 120 is used to provide visible indicia on disc 140. Thus in this embodiment disc 140 includes a transparent plastic disc 142 with a pattern 144 of surface modifications on one side. Pattern 144 is covered by a layer 146 of highly reflective material such as aluminum. Layer 146 is protected by a layer of lacquer 148. Pattern 144 includes at least two kinds of regions 144a and 144b. In regions 144a pattern 144 includes many small features. In regions 144b, however, pattern 144 is smooth over relatively large areas. Light passing into disc 142 is reflected back through the disc visibly very differently depending on whether the reflection is from a region 144a or a region 144b. Regions 144a tend to scatter the light and therefore appear frosted, while regions 144b have a more mirror-like appearance. These visibly contrasting regions can be used to provide any desired visible indicia. For example, line work for lettering or to outline graphics can be provided by lines done like regions 144b against a background like regions 144a. Or lines done like regions 144a can be against a background done like regions 144b. Figures can be done with large areas like regions 144a against a background like regions 144b. Or a figure can be done with large areas like regions 144b against a background like regions 144a. Halftone-type shading can be provided by alternating regions like 144a and 144b. Visible indicia produced in this way are sometimes referred to herein as "pit art" because of the use of "pits" like those in pattern 124 to produce some of the features of the indicia. Constructing two-disc stack 110c as shown in FIG. 1(a) has the additional advantage that a portion of pattern 144 can be used to record some generic information that is light-readable for playback in the same way that the programming information can be played back from pattern 124.

During the formation of a single-side-readable DVD, a substantially transparent, first, frontside plastic disc (i.e., transparent enough to allow a light beam to remain detectable following round trip travel through the plastic disc) with a substantially planar first surface (i.e., planar enough to allow a light source to differentiate topographical features disposed on a surface of the plastic disc as the disc rotates) is provided. Opposite the first surface is a second surface having program information recorded on it by means of local changes in the distance of the second surface from the first surface. A semi-reflective coating (e.g., silicon carbonate with a reflectivity between approximately 20% and 40% for light with a wavelength of approximately 635 to 650 nanometers) is then deposited over the second surface. Because the coating is semi-reflective and conforms to the local changes of the second surface, when a light beam (e.g., a laser beam) is transmitted through the first surface toward the second surface, a first portion of the light beam is reflected back through the first disc in accordance with the program information recorded by means of the local changes, and a second portion of the light beam is transmitted through the semi-reflective coating.

The formation of the single-side-readable DVD is completed by bonding a second, backside program information disc to the first, frontside program information disc. The second disc is similar to the first disc, having third and fourth surfaces opposite one another and having spillover program information recorded on it by means of local changes in the distance of the fourth surface from the third surface. The single-side-readable DVD is formed by bonding the first and second discs back to back so that the fourth surface of the second, backside disc faces the second surface of the first, frontside disc.

Unlike the frontside disc, only a portion of the backside disc contains program information (e.g., only the portion required to record the spillover program information). Furthermore, the fourth surface of the backside disc is coated with a reflective coating (e.g., greater than 70% reflective for a wavelength of approximately 635 to 650 nanometers) rather than a semi-reflective coating. The reflective coating allows the second portion of the light beam (transmitted through the semi-reflective coating of the frontside disc) to reflect toward and re-transmit through the semi-reflective coating and the frontside disc.

Accordingly, to read program information from the second surface of the frontside disc, a laser beam is focused on the second surface and the light reflected therefrom is detected and interpreted. Program information is similarly read from the fourth surface of the backside disc by focusing a laser beam through the frontside disc and on the fourth surface and detecting and interpreting the light reflected therefrom.

Because in a single-side-readable DVD program information stored on the backside disc is read through the frontside disc rather than through the backside disc, the third surface of the backside disc is unused by a DVD player. Graphical information (e.g., textual instructions, artwork, etc.), therefore, may be stored on the third surface of the backside disc without affecting the DVD's playability. Conventionally, graphical information is placed only on the third surface of the backside disc, and as such, graphical information is not viewable from the frontside of the DVD. This ensures that the program information stored on the second surface of the frontside disc and on the fourth surface of the backside disc remains readable.

Nonetheless, it is desirable to have graphical information viewable from the frontside of a single-side-readable DVD so as to provide textual instructions, artwork, and the like. However, such graphical information must not affect the playability of the DVD.

In view of the foregoing, it is an object of this invention to provide methods for transferring or translating graphical information to a single-side-readable DVD so that the graphical information is viewable from the frontside disc of the DVD and so that the playability of the DVD is unaffected.

SUMMARY OF THE INVENTION

These and other objects of the invention are accomplished in accordance with the principles of the invention by providing methods for transferring or translating graphical information to a single-side-readable DVD so that the graphical information is viewable from the frontside disc of the DVD and so that the playability the DVD is unaffected. A first, frontside disc having a first and a second surface and having program information recorded on it by means of local changes in the distance of the second surface from the first surface is provided. A semi-reflective coating is then deposited over the second surface.

A second, backside disc having a third and a fourth surface and having spillover program information recorded on a first portion of it by means of local changes in the distance of the fourth surface from the third surface is also provided. Unlike the backside disc of conventional single-side-readable DVDs, graphical information is also placed on a second portion of the fourth surface of the second disc. The graphical information may comprise textual information, holographic artwork, pit art (see, for example, previously incorporated Marquardt U.S. Pat. No. 5,729,533), enhanced pit art (see, for example, Van Hoof U.S. Pat. No. 5,958,651), generic or specific artwork (see, for example, Parette U.S. Pat. No. 5,766,495), labels, and the like. Preferably, the second portion of the fourth surface is separate from the first portion of the fourth surface.

To complete DVD formation, a reflective coating is deposited over the fourth surface, and the first and second discs are bonded together so that the second surface of the first, frontside disc faces the fourth surface of the second, backside disc. Because the coating on the second surface of the frontside disc is semi-reflective, the graphical information is viewable through the frontside disc. Furthermore, such placement of the graphical information does not affect the playability of the DVD.

Further features of the invention, its nature and various advantages, will be more apparent from the accompanying drawings and the following detailed description of the preferred embodiments.

DETAILED DESCRIPTION OF THE PREFERRED EMBODIMENTS

Figure 1:
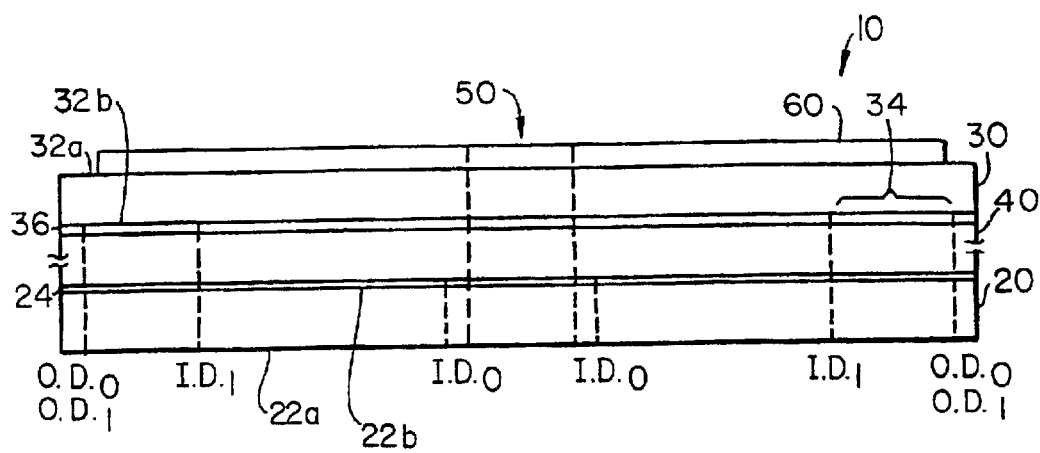
FIG. 1 is a side elevational view of a conventional single-side-readable DVD.

FIG. 1 shows a side elevational view of a conventional single-side-readable DVD 10. Conventional single-side-readable DVD 10 comprises a first, frontside disc 20 bonded to a second, backside disc 30 with an adhesive bonding material 40.

First disc 20 comprises a substantially smooth first surface 22a and a second surface 22b having program information recorded on it by means of local changes (not shown) in the distance of second surface 22b from first surface 22a. The program information is located between the inner information diameter (I.D.$_0$) and the outer information diameter (O.D.$_0$) of first disc 20. A semi-reflective coating 24 is deposited over second surface 22b. Typically, semi-reflective coating 24 is approximately 20% to 40% reflective within the wavelength range of 635 to 650 nanometers.

Second disc 30 comprises a substantially smooth third surface 32a and a fourth surface 32b. A portion 34 of fourth surface 32b has spillover program information recorded on it by means of local changes (not shown) in the distance of fourth surface 32b from third surface 32a. The spillover program information, when present, represents program information which would not fit on the first disc 20, and is located between the inner information diameter (I.D.$_{-1}$) and the outer information diameter (O.D.$_{-1}$) of second disc 30. A reflective coating 36 is deposited over fourth surface 32b. Reflective coating 36 usually has a reflectivity of at least 70% within the wavelength range of 635 to 650 nanometers.

Conventional single-side-readable DVD 10 is formed by bonding first disc 20 to second disc 30 with adhesive bonding material 40 so that second surface 22b of first disc 20 faces fourth surface 32b of second disc 30. A hole 50 passes through the center of DVD 10 and allows DVD 10 to be held during playback and storage.

During playback, DVD 10 is rotated and a laser beam (not shown) is focused on second surface 22b of first disc 20 at the inner information diameter (I.D.$_0$). The laser beam travels through first disc 20, reflects off semi-reflective coating 24 (and thus is modulated by the program information recorded on second surface 22b), and travels back through first disc 20 where it is detected and interpreted. Program information recorded on the remainder of second surface 22b of first disc 20 is read by scanning the focused laser beam from the inner information diameter (I.D.$_0$) to the outer information diameter (O.D.$_0$) of first disc 20.

Once at the outer information diameter (O.D.$_0$) of first disc 20, assuming spillover program information is recorded on portion 34 of second disc 30, the laser beam is re-focused on fourth surface 32b of second disc 30 at the outer information diameter (O.D.$_{-1}$). Because coating 24 is semi-reflective, the laser beam travels through the first disc 20, through the semi-reflective coating 24, reflects off the reflective coating 36 (and thus is modulated by the spillover program information recorded on portion 34 of second disc 30), and travels back through semi-reflective coating 24 and first disc 20 where it is detected and interpreted. The laser beam is then scanned from the outer information diameter (O.D.$_{-1}$) to the inner information diameter (I.D.$_{-1}$) of second disc 30 to read the remainder of the spillover program information contained therein.

Because program information recorded on DVD 10 is read by scanning the laser beam from the inner information diameter (I.D.$_0$) to the outer information diameter (O.D.$_0$) of first disc 20, and then from the outer information diameter (O.D.$_{-1}$) to the inner information diameter (I.D.$_{-1}$) of second disc 30, DVD 10 is referred to as an opposite track path (OTP) DVD. DVD 10 may be alternatively configured so that program information is read therefrom by scanning the laser beam from the inner information diameter (I.D.$_0$) to the outer information diameter (O.D.$_0$) of first disc 20, and then from the inner information diameter (I.D.$_{-1}$) to the outer information diameter (O.D.$_{-1}$) of second disc 30 (rather than from the outer information diameter (O.D.$_{-1}$) to the inner information diameter (I.D.$_{-1}$) as in an OTP DVD). Such a DVD is referred to as a parallel track path (PTP) DVD. The DVD Consortium has established specific guidelines for program information and lead-out information (i.e., end of program information markers) placement for both OTP and PTP DVDs.

Conventionally, graphical information (e.g., artwork, textual information, and the like) is stored only on third surface 32a of second disc 30. A graphical image 60, for example, is shown on third surface 32a in FIG. 1. To prevent interference between graphical information and program information, graphical information is not provided on the first disc 20 side of DVD 10. That is, graphical information is not viewable through the first, frontside disc 20 of conventional DVD 10.

Figure 2:
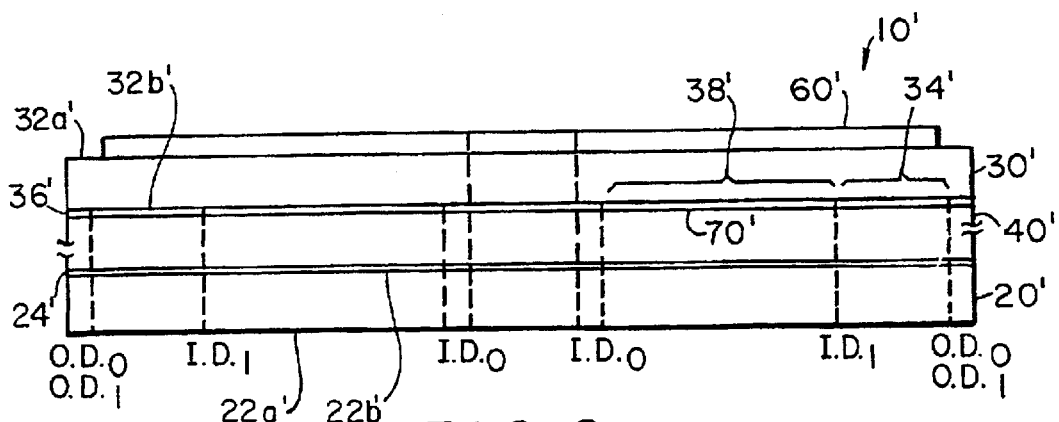
FIG. 2 is a side elevational view of an inventive single-side-readable DVD made in accordance with the invention.
Figure 1A:
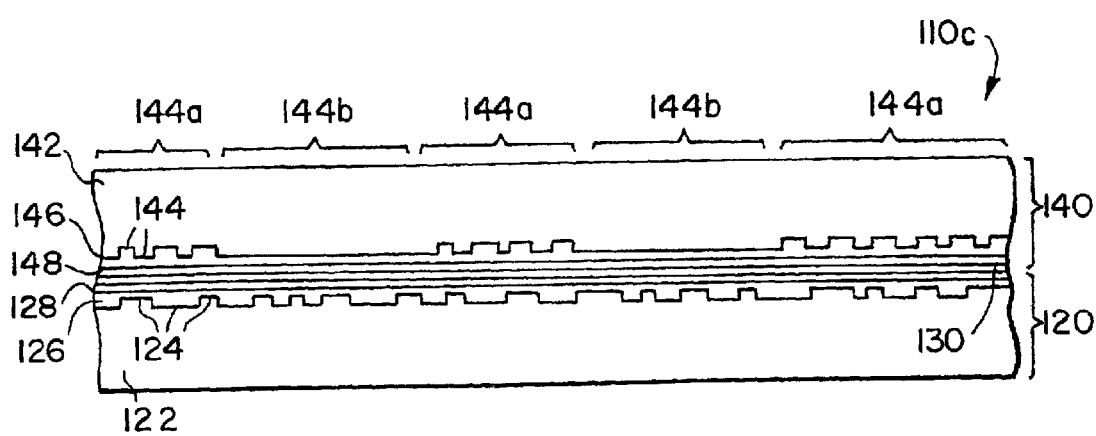
FIG. 1a is a side elevational view of a prior art two-side-readable DVD.

FIG. 2 shows a side elevational view of an inventive single-side-readable DVD 10'. Like conventional single-side-readable DVD 10 of FIG. 1, inventive single-side-readable DVD 10' comprises a first, frontside disc 20' bonded to a second, backside disc 30' with an adhesive bonding material 40'.

First disc 20' comprises a substantially smooth first surface 22a' and a second surface 22b' having program information recorded on it by means of local changes (not shown) in the distance of second surface 22b' from first surface 22a'. The program information is located between the inner information diameter (I.D.$_0$) and the outer information diameter (O.D.$_0$) of first disc 20', and a semi-reflective coating 24' (similar to semi-reflective coating 24 of FIG. 1) is deposited over second surface 22b'.

Second disc 30' comprises a substantially smooth third surface 32a' and a fourth surface 32b', with a portion 34' of fourth surface 32b' having spillover program information recorded on it by means of local changes (not shown) in the distance of fourth surface 32b' from third surface 32a'. The spillover program information is located between the inner information diameter (I.D.$_{-1}$) and outer information diameter (O.D.$_{-1}$) of second disc 30', and a reflective coating 36' (similar to reflective coating 36 of FIG. 1) is deposited over fourth surface 32b'.

As with conventional single-side-readable DVD 10, inventive single-side-readable DVD 10' may comprise a graphical image 60' on third surface 32a' of second disc 30'. Note that graphical image 60 (FIG. 1) and graphical image 60' (FIG. 2) are viewable only from the non-readable side (second disc 30 side) of DVD 10 and the non-readable side (second disc 30' side) of DVD 10', respectively.

Unlike conventional DVD 10, inventive DVD 10' comprises graphical information viewable from the readable side (first disc 20' side) of DVD 10'. That is, a portion 38' of fourth surface 32b' of second disc 30' is provided with graphical information 70' viewable through first disc 20'. Graphical information 70' is viewable through first disc 20' because the coating 24' is semi-reflective. Graphical information 70' may comprise pit art, enhanced pit art, generic or specific artwork, holographic artwork, textual information, or any similar graphical information.

So that the playability of DVD 10' is unaffected by graphical information 70', preferably, portion 38' of fourth surface 32b' (the portion that contains graphical information 70') is separate from portion 34' of fourth surface 32b' (the portion that contains spillover program information) and does not interfere with DVD Consortium guidelines for program information and lead-out information placement or with any similar playability requirements. For instance, as shown in FIG. 2, for an OTP DVD spillover program information recorded on portion 34' of fourth surface 32b' is preferably located radially outside of graphical information 70' formed on portion 38' of fourth surface 32b'. In this manner, a stop bit or other lead-out information may be placed near the inner information diameter (I.D.$_{-1}$) of second disc 30' to signal a DVD player to stop scanning fourth surface 32b' of DVD 10' for spillover program information. (Note that for a PTP DVD lead-out information would be placed near the outer information diameter (O.D.$_{-1}$) of second disc 30'.) Upon detecting the stop bit, the DVD player will know it has detected all spillover program information and will stop scanning fourth surface 32b' prior to reaching graphical information 70'. The playability of DVD 10' is thereby unaffected by graphical information 70'.

It will be understood that the foregoing is only illustrative of the principles of this invention, and that various modifications can be made by those skilled in the art without departing from the scope and spirit of the invention. For example, graphical information 70' may be placed at any location along fourth surface 32b' of second disc 30' by including a command within the spillover program information instructing a DVD player to ignore or skip over the graphical information portion of fourth surface 32b'. Similarly, graphical information 70' may be placed along second surface 22b' of first disc 20'. Labels or any other indicia can be used as graphical information 70'.

What is claimed is:

1. An information recording medium comprising:
   a first substantially transparent plastic disc having a first surface and a second surface opposite to said first surface, said second surface having first information recorded on it by means of local changes in the distance of said second surface from said first surface;
   a semi-reflective coating on said second surface for reflecting a first portion of light passed through said first disc back through said first disc and for transmitting a second portion of said light through said semi-reflective coating, said semi-reflective coating conforming to said local changes of said second surface so that said first portion of said light is reflected back through said first disc in accordance with the first information recorded by means of said local changes of said second surface;

a second plastic disc of approximately the same thickness as said first disc, said second disc having opposite third and fourth surfaces, a first portion of said fourth surface having second information recorded on it by means of local changes in the distance of said first portion of said fourth surface from said third surface and a second portion of said fourth surface having graphical information formed thereon by surface modifications in said fourth surface which tends to scatter light directed to the fourth surface; and a reflective coating on said fourth surface for reflecting said second portion of said light transmitted through said first disc back through said first disc, said reflective coating conforming to said local changes of said first portion of said fourth surface so that said second portion of said light is reflected back through said first disc in accordance with the second information recorded by means of said local changes of said fourth surface, said second disc being stacked on and secured to said first disc so that said fourth surface faces said second surface such that said graphical information formed on said fourth surface is visible through said first disc having said first information and through said semi-reflective coating.

2. The recording medium defined in claim 1 wherein said third surface of said second disc comprises additional graphical information.

3. The recording medium defined in claim 1 wherein said graphical information comprises at least one of generic and specific information.

4. The recording medium defined in claim 1 wherein said graphical information comprises pit art.

5. The recording medium defined in claim 1 wherein said graphical information comprises enhanced pit art.

6. The recording medium defined in claim 1 wherein said graphical information comprises holographic artwork.

7. The recording medium defined in claim 1 wherein said first portion of said fourth surface is located radially outside of said second portion of said fourth surface so that said second information is located radially outside of said graphical information.

8. The recording medium defined in claim 1 wherein said semi-reflective coating comprises silicon carbonate.

9. The recording medium defined in claim 1 wherein said semi-reflective coating is approximately 20% to 40% reflective for light with a wavelength of approximately 635 to 650 nanometers.

10. The recording medium defined in claim 1 wherein said reflective coating comprises aluminum.

11. The recording medium defined in claim 1 wherein said reflective coating is at least 70% reflective for light with a wavelength of approximately 635 to 650 nanometers.

12. A recording medium formed by a method comprising:

forming a first substantially transparent plastic disc which has a first surface and a second surface opposite to said first surface on which first information is recorded by means of local changes in the distance of said second surface from said first surface;

coating said second surface of said first disc with a semi-reflective coating which reflects a first portion of light passed through said first disc back through said first disc and which transmits a second portion of said light through said semi-reflective coating, said semi-reflective coating conforming to said local changes of said second surface so that said first portion of said light is reflected back through said first disc in accordance with the first information recorded by said local changes of said second surface;

forming a second plastic disc which has a third surface and a fourth surface opposite to said third surface, a first portion of said fourth surface having second information recorded on it by means of local changes in the distance of said fourth surface from said third surface and a second portion of said fourth surface having graphical information formed thereon by surface modifications in said fourth surface which tends to scatter light directed to the fourth surface;

coating said fourth surface of said second disc with a reflective coating which reflects said second portion of said light transmitted through said first disc back through said first disc, said reflective coating conforming to said local changes of said first portion of said fourth surface so that said second portion of said light is reflected back through said first disc in accordance with said second information recorded by said local changes of said fourth surface; and bonding said first disc to said second disc so that the bonded disc forms a permanent two-disc stack with said second surface of said first disc facing said fourth surface of said second disc such that said graphical information formed on said fourth surface is visible through said first disc having said first information and through said semi-reflective coating.

* * * * *